Patented Apr. 9, 1946

2,398,175

UNITED STATES PATENT OFFICE 2,398,175

THE TREATMENT OF SULPHIDE CATALYSTS

Robert M. Cole, Long Beach, Calif., assignor to Shell Development Company, San Francisco, Calif., a corporation of Delaware No Drawing. Application May 20, 1943,
Serial No. 487,807

5 Claims. (Cl. 252—243)

This invention relates to a method for the treatment of metal sulphide catalysts. By metal sulphide catalysts is meant the various catalysts used for the conversion of carbonaceous materials and containing as the predominating active constituent one or more metal sulphides. Most of the better known catalysts of this type comprise one or more sulphides of heavy metals, such in particular as the metals of group VI of the periodic system of the elements. A particular catalyst, to the use and treatment of which the present invention relates, comprises tungsten sulphide. The various metal sulphides are employed alone or in combination with one or more other materials which may or may not be catalytically active. Thus, particularly suitable catalysts comprise a sulphide of a metal of group VI of the periodic system of the elements in combination with another metal sulphide, such for instance as a sulphide of a metal of group VIII of the periodic system of the elements, and more particularly a metal of the iron group of said group VIII. A more particular catalyst to the use and treatment of which the invention relates comprises tungsten sulphide and nickel sulphide, the nickel sulphide being preferably in mol excess.

These catalysts may be used in a finely divided state or deposited upon a suitable inert carrier, but are more generally applied in the form of formed particles, i. e. particles of suitable size and shape produced by pilling, pelleting, extruding or the like. Catalysts produced by said forming operations generally consist predominantly of the metal sulphides and are generally superior to those containing minor amounts of the metal sulphides supported upon carrier substances. A minor amount of filling and/or extending materials may, however, be included in the formed catalysts.

A characteristic of the sulphide catalysts of the type described is that in the catalytic treatment or conversion of carbonaceous materials at elevated temperatures they are invariably employed in the presence of a superatmospheric pressure of hydrogen. Thus, the partial pressure of hydrogen is above one atmosphere and usually considerably higher, for instance, 40–100 atmospheres. As will be readily apparent, most of the metal sulphides employed in these catalysts are difficultly reducible, i. e. they are not reduced to the metal under the reaction conditions. Also, most of the sulphide catalysts of the type described are sulph-active, i. e. relatively resistant to poisoning by sulphur compounds such as found as natural impurities in coal, petroleum, etc.

Most of these various sulphide catalysts were developed primarily for destructive hydrogenation processes but are also found to be exceptionally advantageous for use in a wide variety of catalytic conversions involving the treatment of solid, liquid, and/or gaseous organic materials at elevated temperatures in the presence of hydrogen. Thus, aside from their use in the destructive hydrogenation of various carbonaceous materials they are particularly suitable for effecting such conversions and treatments, by way of example, as the following: the purification of crude benzol, toluol, etc., the desulphurization of hydrocarbon fuels, the reduction of phenols, cresols, etc., to aromatics, the hydrogenation of olefin polymers and other unsaturated carbonaceous materials, the hydrogenation of aromatic hydrocarbons, the dehydrogenation of naphthenes to aromatic hydrocarbons, the dehydrogenation of alcohols, etc.

These catalysts are competitive for most of these and related conversions to the various metal oxide catalysts. One of the outstanding characteristics of these catalysts, and particularly the formed catalysts, which makes these generally superior to the oxide catalyst, however, is their ability to retain their excellent catalytic activities for very long periods of use without requiring renewal or regeneration. Thus, whereas the oxide catalysts when used in processing various carbonaceous materials at elevated temperatures are relatively rapidly contaminated with tarry deposits and must be regenerated at very frequent intervals, the sulphide catalysts may be employed continuously over long periods of time. This is a decided advantage. On the other hand, while the oxide catalysts are commonly regenerated hundreds of times before they are discarded, the spent sulphide catalysts are commonly treated to recover valuable metals and then entirely remade. This is due to the lack of a suitable method whereby these catalysts may be reactivated once they have become spent.

The above-described metal sulphide catalysts in spite of their sulph-active nature and exceptionally long life do undergo a certain amount of deactivation with prolonged use and must be eventually discarded. The rate of this deactivation depends upon the particular catalyst, the particular material treated, and the reaction conditions, and may vary considerably. Thus, in certain hydrogenation reactions, for example, catalysts of this type have been employed for over a year while in certain dehydrogenation reactions the catalyst becomes deactivated in a few hundred hours of use. The nature or cause of this deactivation is not completely understood. It has been shown, however, that if the deposition of carbonaceous deposits in the catalyst is a contributing factor it is usually only a minor factor since catalysts have been used which were very active although containing considerable carbonaceous deposits.

It is now found that these various sulphide catalysts of the type described may be effectively treated after their activities have dropped upon prolonged use, and thereby made suitable for additional further long periods of use, before it is necessary to discard and remake them. This treatment comprises a plurality of steps which may, if desired, be effected in situ in the catalytic reactor, thus eliminating damage to the catalyst particles, the expense involved in unloading and reloading the converters, and the cost of providing auxiliary treating equipment which would be used only infrequently.

In the broader embodiment of the invention the catalyst of the type described, after it has become inefficient during a period of use for the conversion of carbonaceous material at an elevated temperature under a superatmospheric pressure of hydrogen, is flushed of hydrogen and more volatile combustible materials with a relatively inert gas; then the catalyst is treated with a gas containing a controlled amount of free oxygen under prescribed conditions thereby to convert the metal sulphide or sulphides to the oxides and to effect at least a partial combustion of carbonaceous deposits; the catalyst is then treated under prescribed conditions with a sulphiding agent thereby to convert the metal oxide or metal oxides to metal sulphide or sulphides; finally the catalyst is treated with hydrogen. In more specific embodiments of the invention these steps are effected with particular agents under particular conditions affording further improved and especially effective results.

In most catalyst regenerations wherein carbonaceous deposits are burnt from the catalyst, the sole object is to burn off the carbonaceous deposits. It has been shown that with the sulphide catalysts of the type in question, this removal of carbonaceous deposits is not the principal object or even necessarily an important object, since only relatively small amounts of carbonaceous deposits are often found in the spent catalyst and very active catalysts sometimes have high residual carbon contents. The object of the treatment of the invention is to change the chemical nature of the catalyst from sulphide to oxide, preferably while avoiding loss of mechanical strength, and then to reconvert it to the sulphide again. In this process, carbonaceous deposits are at least partially removed, and also certain unknown catalyst poisons may possibly be removed. It is believed, however, that the increased activity is brought about by changes in the catalyst crystallites (size, shape and/or spacing). It is also to be noted that the activity of the catalysts of the type in question depends upon a fairly critical sulphur balance. The most active catalysts are initially prepared by partial reduction (desulphurization) of the precipitated sulphides (for instance the reduction of $NiS$ to $Ni_3S_2$). Upon regeneration according to the procedure outlined above and explained in more detail below, the catalysts are reproduced from the opposite direction, i. e. by the addition of sulphur. They nevertheless regain the superior activity of the fresh catalyst prepared by reduction of the precipitated sulphides.

As pointed out above, the catalysts are invariably employed under a pressure of at least one atmosphere of hydrogen and usually several atmospheres pressure of hydrogen. Prior to contacting the catalyst with the gas containing free oxygen, it is necessary, in order to avoid an explosion hazard, to remove any large concentrations of hydrogen. This is effected by the first flushing treatment. The catalyst may be flushed with any relatively inert gas such, for instance, as nitrogen, carbon dioxide, flue gas or the like. The preferred flushing agent is, however, steam. Steam, it is found, has less detrimental effect on the catalyst, particularly the mechanical strength of formed catalysts. Also, because of the superior stripping quality of steam as compared to other inert gases, considerably more hydrogen and/or volatile carbonaceous material is stripped from the catalyst. This allows the flushing step to be carried out in a shorter period of time and/or facilitates the subsequent oxidation step. A suitable steam flush may be effected, by way of example, by passing a stream of steam for about 1–6 hours through a bed of the catalyst maintained at a temperature between about 700–900° F.

When steam is used in the described manner an exothermic reaction takes place to a certain extent, particularly if the catalyst bed is at a temperature of about 800° F. or above. Thus, the use of steam effects something more than a mere purging of volatile materials.

The flushing step may be effected at the working pressure. It is, however, advantageous to depressure the catalyst prior to or during the flushing step.

The catalyst, preferably after a suitable stripping or flushing treatment, and preferably after the described steam treatment, is treated with an oxidizing gas to convert the metal sulphide or metal sulphides to metal oxide or metal oxides. This treatment may be effected by passing a stream of an oxygen-containing gas, such as air, through the catalyst bed. In this treatment the air or other gas containing free oxygen is preferably contacted with the catalyst at a temperature above the ignition temperature of the carbonaceous deposits or above about 600° F. so that at least a part of the carbonaceous deposits are oxidized and removed. During this oxidation considerable heat is evolved. If the rate of introduction of the oxygen-containing gas is not controlled, the temperature in the catalyst bed may increase to such an extent as to damage the catalyst. The rate of introduction of the free oxygen is therefore controlled to maintain the maximum temperature in the catalyst below about 1400° F. This may be effected by controlling the rate of introduction of the oxygen-containing gas such as air, but is preferably effected by controlling the concentration of free oxygen in the gas. Thus, in a preferred embodiment of the process an oxygen-containing gas such as air is diluted with an inert gas such as nitrogen, carbon dioxide, flue gas, or the like, to such an extent that the specified maximum temperature is not exceeded.

In a preferred embodiment of the invention the oxidation step is effected with a mixture of steam and air. The combination of steam and air it is found is particularly desirable when treating formed catalysts. Thus, when formed catalysts of this type are oxidized with air alone or with air diluted with these inert gases a considerable falling-off of mechanical strength of the formed particles takes place, sometimes even leading to complete crumbling. When air is used in combination with steam, on the other hand, only a slight loss of mechanical strength results and the process may be repeated several times before the catalyst becomes too friable for use.

In order to avoid, as far as possible, loss of mechanical strength of the catalyst, the steam is preferably used in excess. A suitable mixture, for example, is produced by adding about 10 mol per cent of air to the steam.

In the regeneration of oxide catalysts and particularly the supported oxide catalysts and oxide gel catalysts, it is known that the relatively high temperatures encountered on the regeneration treatment are detrimental to the catalysts causing a more or less rapid loss of activity, apparently due to deep seated structural changes in the catalysts. Consequently every effort is made to maintain the temperature of the catalysts as low as possible during the burning treatment. When treating formed sulphide catalysts of the above-described type, on the other hand, it is found, contrary to expectation, that this method of operation gives inferior results. Thus, contrary to expectation, it is found that when treating formed sulphide catalysts according to the method of the present invention superior results are obtained if the oxidation treatment is effected at a relatively high temperature, for instance above about 1200° F. Thus, for example, with a preferred tungsten-nickel sulphide catalyst it has been found that more active catalysts are obtained when the oxidation is effected with a maximum temperature of 950° F. than are obtained when the oxidation is effected with a maximum temperature of 850° F. Also, more active catalysts are obtained when the oxidation is effected with a maximum temperature of 1250° F. than are obtained when the oxidation is effected at a maximum temperature of 1050° F.

The oxidation step may be advantageously carried out at substantially atmospheric pressure, but may, if desired, be carried out at the working pressure, or any intermediate pressure.

After the oxidation treatment, the catalyst is preferably flushed of free oxygen and then treated to convert the metal oxide or metal oxides to the metal sulphide or metal sulphides. The flushing step is not essential, but has the advantage of reducing the consumption of the sulphiding agent somewhat. If the catalyst is not flushed prior to the sulphiding treatment, residual oxygen may react with the sulphiding agent to produce free sulphur which deposits on the catalyst. Any free sulphur formed in this manner is reduced to hydrogen sulphide and removed in the subsequent treatment and use of the catalyst. The flushing treatment, if applied, may be effected with any of the above-mentioned flushing gases. In the preferred embodiment of the invention, when the oxidation is effected with a mixture of steam and air, however, the flushing is most advantageously effected with steam. Thus it is merely necessary to stop the flow of air after the desired degree of oxidation has been effected.

The sulphiding treatment may be effected by treating the catalyst at a sulphiding temperature (for instance between about 700° F. and 1000° F.) with a suitable sulphiding agent. The preferred sulphiding agent is hydrogen sulphide. Other sulphiding agents which under these conditions in the presence of the oxidized catalyst yield sulphur, or divalent sulphur compounds such, for example, as carbon disulphide, ethyl mercaptan, a mixture of sulphur dioxide and hydrogen, or the like, may also be employed. Since during this sulphurization heat is evolved, it is advantageous to restrict the rate of addition of the sulphiding agent or preferably the concentration of the sulphiding agent to maintain a maximum temperature below about 1400° F. Suitable diluents for the hydrogen sulphide or other sulphiding agent are hydrogen, nitrogen, flue gas, and the like. Steam may also be advantageously used with the sulphiding agent as a diluent. In view of its higher heat capacity, it may be used in smaller concentrations, thus allowing greater concentrations of the sulphiding agent.

The sulphurization is carried out until the catalyst contains about the same amount of sulphur as the fresh catalyst. Thus, for example in the case of the preferred tungsten-nickel sulphide catalyst containing tungsten and nickel in a mol ratio between about 1:1.5 and 1:2, this sulphurization is continued until enough sulphur has been incorporated to convert the metal into the sulphides $WS_2$ and $Ni_3S_2$ or between 25% and 30% sulphur (for instance, 29 lbs. of sulphur per cubic foot of catalyst pellets). Under the described conditions, it is difficult to incorporate a detrimental excess of sulphur. The sulphurization may therefore be carried out either at atmospheric pressure or elevated pressure, until sulphurization is substantially complete.

After the catalyst is sulphided it is saturated with hydrogen. This is an important step of the process, since if the catalyst is put back on stream without first saturating with hydrogen, it quickly cokes up and becomes inactive. The catalyst may be treated with hydrogen at atmospheric pressure, but in order to insure a thorough saturation, it is desirable that the hydrogen pressure, at least at the end of the treatment, be at least 20 atmospheres. The treatment with hydrogen may also remove small amounts of free sulphur formed in the catalyst as described above. The treatment may be effected, for example, at a temperature between about 700° F. and 900° F. While the saturation may be effected in a few minutes, longer treatment up to several hours is not detrimental and is usually advantageous.

As pointed out above, the catalysts of the invention are invariably employed under a substantial pressure of hydrogen. In practice the hydrogen (or gas rich in hydrogen) is recycled. The final step of the above process may therefore usually be advantageously effected in practice by simply recycling the hydrogen, by which term we mean to include the hydrogen-rich recycle gas, through the catalyst for a short time prior to introducing the carbonaceous reactant.

Sulphide catalysts, after being treated as above-described, are found to be substantially as active as the freshly prepared catalysts, and, in the case of the preferred formed catalysts treated in the preferred manner, they are found to be substantially as strong mechanically as the freshly prepared catalysts. The described treatment may therefore be carried out several times before it is necessary to renew the catalyst.

The process of the invention may be advantageously applied to any of the sulphide catalysts of the type described but is particularly advantageous when the sulphide catalyst is in the form of formed particles such as pellets and the like.

It may, furthermore, be advantageously applied to any of these catalysts when used in any of the various conversions and treatments of carbonaceous materials under relatively high temperatures, for instance, between about 600° F. and 1300° F. in the presence of hydrogen. It is particularly advantageous, however, in various dehydrogenation reactions, such for instance as the dehydrogenation of naphthenic hydrocarbons and naphthenic petroleum fractions, since in these processes these catalysts generally lose activity faster than when used in hydrogenation processes. Another process in which the treatment of the invention is particularly advantageous is the desulphurization of various hydrocarbon fractions and distillates. Particularly excellent catalysts for these processes consist essentially of a pilled combination of tungsten sulphide and a sulphide of a metal of the iron group. The iron group metal, for instance nickel, is preferably in mol excess over the tungsten.

It will be noted from the above that an embodiment of the process of the invention involves a continuous treatment of the spent catalyst with steam to which various agents are consecutively added. Thus, according to this embodiment of the process, the spent catalyst may be depressured and a flow of steam passed through the catalyst bed. After a period of time a controlled amount of air, for instance 10% by volume, is added to the steam. After a further period of time sufficient to allow the catalyst to be substantially completely oxidized, the flow of air is stopped. A controlled flow of sulphiding agent such as hydrogen sulphide, preferably after a brief flushing period with steam alone, is then added to the steam. After a further period of time sufficient to allow substantially complete sulphidation, the flow of sulphiding agent is stopped and then the flow of steam is substituted by recycle gas rich in hydrogen building up to the working pressure. The regenerated catalyst is then put back on stream by introducing the reactant into the recycle stream of hydrogen.

*Example I*

A straight run distillate fraction concentrated in methyl cyclohexane was treated with a tungsten-nickel sulphide catalyst to effect dehydrogenation of the methyl cyclohexane to toluene. The catalyst employed was prepared from the precipitated sulphides by roasting, reducing, and pelleting. The processing conditions were as follows:

| | |
|---|---|
| Temperature ° F. | 840–900 |
| Pressure atm. | 50 |
| Liquid hourly space velocity | 1.5 |
| Mol ratio, hydrogen to feed | 7:1 |
| Length of catalyst bed feet | 16.25 |

The conversion of the methyl cyclohexane to toluene with the fresh catalyst was about 87%. During use the catalyst gradually declined in activity so that after about 2127 hours of processing the conversion had fallen to about 55% at 900° F. At this point the feed was stopped and the catalyst was depressured. The catalyst was flushed with nitrogen. Then the catalyst was treated with steam (300 cu. ft. per hour) at 850° F. for 9.5 hours. 325 cu. ft. of hydrogen was removed from the catalyst during the first 4 hours and 25 additional cu. ft. during the last 4.5 hours. The steam flow was then increased to 1140 cu. ft. per hour (vapor space velocity per minute of 12.3), and about 132 cu. ft. of air per hour added (vapor space velocity per minute of 1.4). The flow of air was regulated to maintain the temperature between 1230° F. and 1380° F. As soon as the oxygen content of the non-condensable exit gas reached 10%, the air and steam were shut off and the system flushed with 100 cu. ft. of nitrogen. Immediately following the nitrogen flush and with the catalyst bed at 850° F., undiluted hydrogen sulphide was introduced and the flow was regulated to maintain a maximum temperature below about 1250° F. The average sulphidation temperature was 1180° F. The sulphidation was considered complete at the end of 12 hours, at which time the catalyst had taken up 29.6 pounds of sulphur per cubic foot. The catalyst was then treated with hydrogen (recycle gas) and the pressure brought up to about 20 atmospheres to insure saturation. The catalyst was then brought back on stream. After the above treatments the conversion of the methyl cyclohexane was about 76% at 860° F. The pressure drop through the 16.25-ft. catalyst bed prior to the above treatment was about 10 p. s. i. After the described treatment the pressure drop was about 8 p. s. i. The total amount of carbon removed from the catalyst by the above treatment was calculated to be only 1.3 pounds. It is seen that the catalyst was restored to its high initial activity without disintegration of the pellets.

*Example II*

A blend of straight run and cracked light naphthas having a boiling range of 200° F.–240° F. and a sulphur content of 0.24% (of which about 0.18% was thiophenic sulphur) was desulphurized by treatment with a tungsten-nickel sulphide catalyst, such as described in Example I. The conditions were as follows:

| | |
|---|---|
| Temperature °F. | 800 |
| Pressure p. s. i. | 625 |
| Mol ratio, hydrogen to feed | 2:1 |
| Average liquid hourly space velocity | 20 |

The desulphurization was initially about 99% complete. After treating about 26,650 bbls. of feed per bbl. of catalyst, the desulphurization had decreased to about 73% complete (0.065% S in the product). At this point the feed was stopped and the catalyst was depressured. A flow of steam was passed through the catalyst and at the end of about 5 minutes the catalyst was oxidized substantially completely with a mixture of steam and air under the following conditions:

| | |
|---|---|
| Furnace temperature | 900° F. |
| Temperature of regeneration zone | 1250° F. |
| Steam (vapor space velocity per min.) | 88 |
| Air (vapor space velocity per min.) | 64 |
| Pressure | 1 atm. (at exit) |
| Length of treatment | 70 min./ft. of catalyst bed |

The air flow was then stopped and then after a few minutes the flow of steam was substituted by a flow of hydrogen sulphide. The sulphidation was effected under the following conditions:

| | |
|---|---|
| Hydrogen sulphide (vapor space velocity per min.) | 75 |
| Temperature (maximum) | 1050° F. |
| Pressure | 1 atm. (at exit) |
| Length of treatment | 30 min./ft. of catalyst bed |

After the sulphiding treatment the catalyst was treated with hydrogen (recycle gas) for a few minutes and the pressure brought up to above 20 atmospheres. The catalyst was then brought back on stream. After the above treatments the desulphurization was about 98.8% complete. Upon continuing the treatment the rate of decline of the catalyst activity was the same as that of the freshly prepared catalyst. Thus, the above-described treatments completely restored the activity of the catalyst and greatly increased the production of desulphurized product per barrel of catalyst. Aside from this excellent result, it is to be noted that the regeneration was effected without any disintegration of the catalyst pellets and without excessive loss of mechanical strength. Various methods commonly used to regenerate other catalysts were tried but were found to be ineffective and/or to cause disintegration and loss of strength of the catalyst.

*Example III*

The catalyst of Example II, after being employed for treating 26,650 bbls. of feed per bbl. of catalyst and being treated as described in Example II, was used for a considerable period. When the catalyst activity dropped to the extent that the desulphurization was about 83%, the feed was stopped and the catalyst depressured. It was then steamed at a vapor space velocity of 55 per minute and oxidized with a mixture of air and steam under the following conditions:

| | |
|---|---:|
| Catalyst bed temperature °F | 900 |
| Oxidation temperature (inlet) °F | 1205 |
| Oxidation temperature (outlet) °F | 1085 |
| Air vapor space velocity per minute | 53 |
| Steam, vapor velocity per minute | 55 |
| Time of treatment hours | 5 |

The catalyst was then flushed with steam and then sulphided with hydrogen sulphide (vapor space velocity per minute=28) at a temperature of about 965° F. Hydrogen was then passed over the catalyst and the pressure brought up to above 20 atm. The catalyst was then used to effect further desulphurization and was found to be fully as active as the fresh catalyst.

I claim as my invention:

1. A process for the treatment of catalysts consisting essentially of metal sulphides which have become relatively inefficient during use in the treatment of a carbonaceous material at an elevated temperature under a superatmospheric pressure of hydrogen which comprises passing a stream of steam through the catalyst for a time to remove hydrogen and more volatile combustible materials, then adding free oxygen to said stream of steam at a rate so controlled that the temperature is at least 1200° F. and that the maximum temperature in the catalyst is below about 1400° F., stopping the addition of free oxygen to said stream of steam, adding hydrogen sulphide to said stream of steam at a rate so controlled that the maximum temperature in the catalyst does not exceed about 1400° F., and finally treating the catalyst with hydrogen at a pressure of at least 20 atmospheres and at a temperature between about 700° F. and about 900° F., whereupon the catalytic conversion of carbonaceous material may be resumed.

2. Process according to claim 1 in which the catalyst is in the form of formed particles consisting essentially of a sulphide of tungsten.

3. Process according to claim 1 in which the catalyst is in the form of formed particles consisting essentially of a sulphide of tungsten and a sulphide of a metal of the iron group.

4. Process according to claim 1 in which the catalyst is in the form of formed particles consisting essentially of a sulphide of tungsten and a sulphide of nickel.

5. Process according to claim 1 in which the catalyst is in the form of formed particles consisting essentially of a major amount in mols of a sulphide of a nickel and a minor amount of a sulphide of tungsten.

ROBERT M. COLE.